United States Patent

Tischler

[11] Patent Number: 5,290,499
[45] Date of Patent: Mar. 1, 1994

[54] APPARATUS AND METHOD FOR SEALING A MOLD BOX

[75] Inventor: Robert Tischler, Northwood, N.H.

[73] Assignee: Davidson Textron Inc., Dover, N.H.

[21] Appl. No.: 886,683

[22] Filed: May 21, 1992

[51] Int. Cl.⁵ .................. B29C 33/02; B29C 41/04; B29C 41/18; B29C 41/46

[52] U.S. Cl. ................... 264/301; 264/302; 264/304; 264/310; 425/256; 425/425; 425/435; 425/447; 425/DIG. 47

[58] Field of Search ............ 264/301, 302, 304, 306, 264/245, 255, 310, DIG. 60, 332, 334; 425/DIG. 47, 134, 434, 435, 425, 447, 256

[56] References Cited

U.S. PATENT DOCUMENTS

| | | | |
|---|---|---|---|
| 4,217,325 | 8/1980 | Colby | 264/301 X |
| 4,668,459 | 5/1987 | Joh | 264/302 X |
| 4,683,098 | 7/1987 | Belleville et al. | 264/302 |
| 4,716,003 | 12/1987 | Gaudreau | 264/302 |
| 4,773,844 | 9/1988 | Bartels et al. | 425/435 |
| 4,790,510 | 12/1988 | Takamatsu et al. | 249/117 |
| 4,925,151 | 5/1990 | Gray | 264/245 X |
| 5,033,954 | 7/1991 | Kargarzadeh | 264/DIG. 60 X |
| 5,093,066 | 3/1992 | Batchelder et al. | 264/301 X |
| 5,127,818 | 7/1992 | Tibbetts et al. | 264/302 X |
| 5,137,679 | 8/1992 | Tibbetts et al. | 264/302 |

FOREIGN PATENT DOCUMENTS 2144913 6/1987 Japan .................. 264/302

Primary Examiner—Karen Aftergut
Attorney, Agent, or Firm—Reising, Ethington, Barnard, Perry & Milton

[57] ABSTRACT

An apparatus (10) for molding a thin-wall plastic shell includes a powder box (12) and a mold box (14). The powder box (12) is positioned to an operative position wherein an opening (18) in the powder box (12) is brought in proximity to the mold surface (20) of the mold. A contoured selective charge application panel (36) has a gasket (30) about the end thereof and the selective charge application panel (36) is extended vertically from the opening (18) at variable heights to perfect a sealed surface at the opening (18) and the periphery (22) of the mold surface (20) to mask vertically extending waste surfaces (14a, 14b).

4 Claims, 3 Drawing Sheets

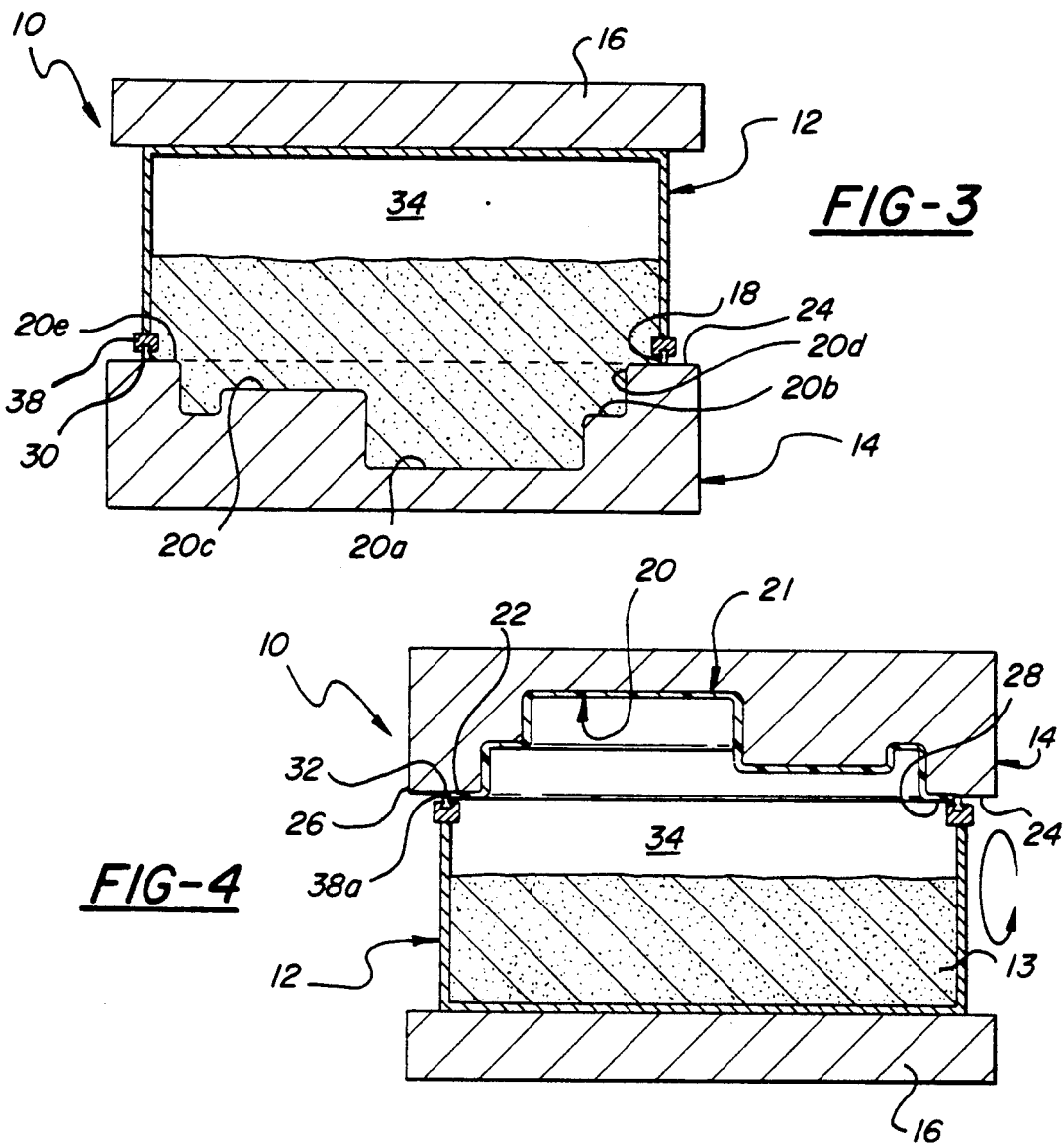
FIG-3
FIG-4
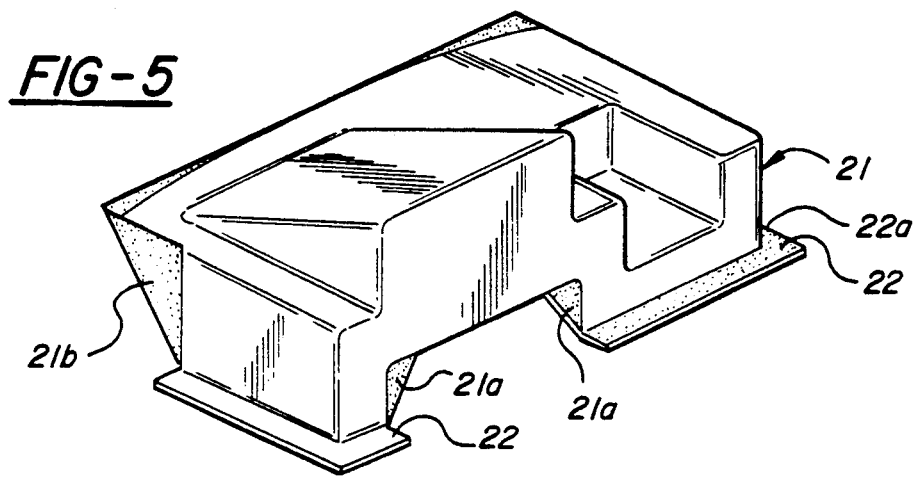
FIG-5

APPARATUS AND METHOD FOR SEALING A MOLD BOX

TECHNICAL FIELD

The present invention relates to an apparatus and method for molding a thin-wall plastic shell. More particularly, the present invention relates to a molding apparatus and method utilizing a powder box and mold box wherein the mold box has a deeply recessed variable depth mold surface.

BACKGROUND ART

In processes for molding thin-walled plastic shells, a thermoplastic resin material is fed through an opening in a powder box to a mold surface of a mold box. Generally, the mold box and powder box are operatively connected such that the mold surface of the mold box is brought into close proximity of the opening in the powder box. The resin material is fed over the mold surface of the heated mold box and is melted into a molten resin film. The film is cooled to obtain the thin-walled plastic shell and is removed from the mold surface.

Currently, this molding process is accomplished with the powder box and mold box sealing where the two units meet; that is, at the top of the liner about the opening of the powder box and near the termination of the run off of the mold surface. This process allows the powder resin to contact the surface areas of the mold where such contact is not desired, causing waste and necessitating trimming of the finally formed part. Other methods known in the art of blocking this exposure, such as by using various insulating materials on the mold surface, still pose the problem of having to adopt special impacting and/or cooling, and/or brushing methods to keep them clean.

For example, the U.S. Pat. No. 4,790,510 to Takamtasu et al, issued Dec. 13, 1988, discloses a slush mold apparatus and method for molding film moldings such as surface coverings of interior parts of automotive vehicles. The powder box includes a skirt portion connected thereto having a lower edge which contacts the mold surface about its upper outer periphery. The skirt is a solid member which must be uniquely adapted to each unique mold surface configuration.

U.S. Pat. No. 4,773,844 discloses two mold boxes, each having a skin of thermoplastic material formed thereon. The mold boxes are then joined at margins under light pressure so as to separate salvage from the joined skins.

Presently there are two other methods being used to "control" thermoplastic resin powder flow (deposition on the shell mold surface) during the molding process. Only the second method selectively controls the powder placement.

One method grossly controls the flow of such powder, e.g., polyvinylchloride. The powder box is simply sealed to the shell mold on a perimeter flange. All mold surfaces interior to the powder box gasket are allowed to contact the powder thus forming (molding) a shell on the entire mold surface. The drawback to this method is that, on the average, 50% of the mold surface is not actual finished part surface (sometimes referred to as Class "A" surface). The shell molded on non-Class "A" areas is scrap material.

Another control method uses insulators mounted on non-Class "A" mold surfaces. The insulators and modulation of heat in these areas reduce the temperature of the exposed surface to the powder to a degree where the powder does not adhere, thus shell is not formed in the areas of the insulators. Such insulators are shown in U.S. Pat. Nos. 4,683,098 and 4,716,003 owned by the assignee of the present invention.

The present invention provides an apparatus and method for sealing the mold about its periphery along a variable height narrow width band to form a narrow flange on the thin-wall shell molded therein. Accordingly, the present apparatus and method generate little or no waste and trimming is reduced. Further, the present invention provides an apparatus and method for providing such a narrow width band portion seal between the opening of the powder box and the periphery of the mold surface at deep recesses within the mold. Such deep mold surfaces are formed in a mold box such that common mold box peripheries cannot extend into the mold surface to contact the periphery of the mold surface about the shell to be formed and further have surfaces thereon in which waste thermoplastic powder can build up when the mold is uniformly heated. The present invention provides an apparatus and method for perfecting such a seal in deep molds as well as in more shallow molds by use of a core device connected to the open edge of a powder box and having a variable height open edge that conforms to either deep or shallow molds. Such a device can be adapted for both deep and shallow molds such that a single device is not limited to either deep or shallow mold use and the device is adapted to carry a gasket retainer and seal gasket with a perimeter shaped to form a variable height small width band seal to form a narrow flange at variable heights on the molded shell.

SUMMARY OF THE INVENTION

In accordance with the present invention, there is provided an apparatus for molding a thin-wall plastic shell including a powder box having an opening for receiving and removing powder therefrom and a mold box including a mold surface having a predetermined outer periphery thereabout over which a plastic shell is molded and having an additional vertically exposed waste surface. Positioning means position either of the mold box and powder box between a neutral position wherein the opening is displaced from the mold surface and an operative position wherein the opening and the mold surface are positioned in proximity to each other. A selective charge application panel device is connected to the powder box to extend in sealed engagement with the periphery of the mold surface to perfect a variable height narrow width band seal about the periphery of the shell formed on the mold surface and to block access between the powder box opening and the mold surface by masking vertically disposed waste surfaces on the mold.

The selective charge application panel is comprised of a fiberglass/foam core contoured panel which attaches to the top of the powder box. On top of the panel is a metal or plastic contoured gasket retainer and an elastomeric seal gasket.

The panel is constructed in such a way so as to mate to the shell mold just outboard of the Class "A" areas. Mating surfaces in the mold are created to satisfy gasket sealing constraints.

When the powder is fed into the shell mold, it now can only contact the Class "A" areas plus a small perimeter band of material used to aid in subsequent part manufacturing processes.

Areas where scrap material was once made do not contact the powder, no shell is formed, and there is a reduction of waste. As the name indicates, the mold is selectively charged with the thermoplastic powder.

The present invention further provides a process for manufacturing a thin-walled plastic shell, the method including the steps of positioning a mold surface having a predetermined outer periphery and an opening of a powder box containing powdered resin to an operative position wherein the opening and mold surface are in proximity to each other. A selective charge application panel device is positioned about the opening on a narrow width band in sealed engagement with a variable height periphery of the mold surface. A sealed joint is perfected between the opening and the periphery of the mold surface to block access to vertically disposed waste surface on the mold. A part is molded from the resin on the mold surface inboard of the narrow width band portion. The molded part is removed from the mold surface.

FIGURES IN THE DRAWINGS

Other advantages of the present invention will be readily appreciated as the same becomes better understood by reference to the following detailed description when considered in connection with the accompanying drawings wherein:

FIG. 3 is a diagrammatic view of the connected apparatus rotated to expose the powdered resin to the mold surface;

FIG. 4 is a diagrammatic view of the connected apparatus returned to the original position having a part molded thereon; and FIG. 5 is a perspective view of a shell mold part removed from the mold apparatus of FIG. 1.

DETAILED DESCRIPTION OF THE DRAWINGS

Figure 1:
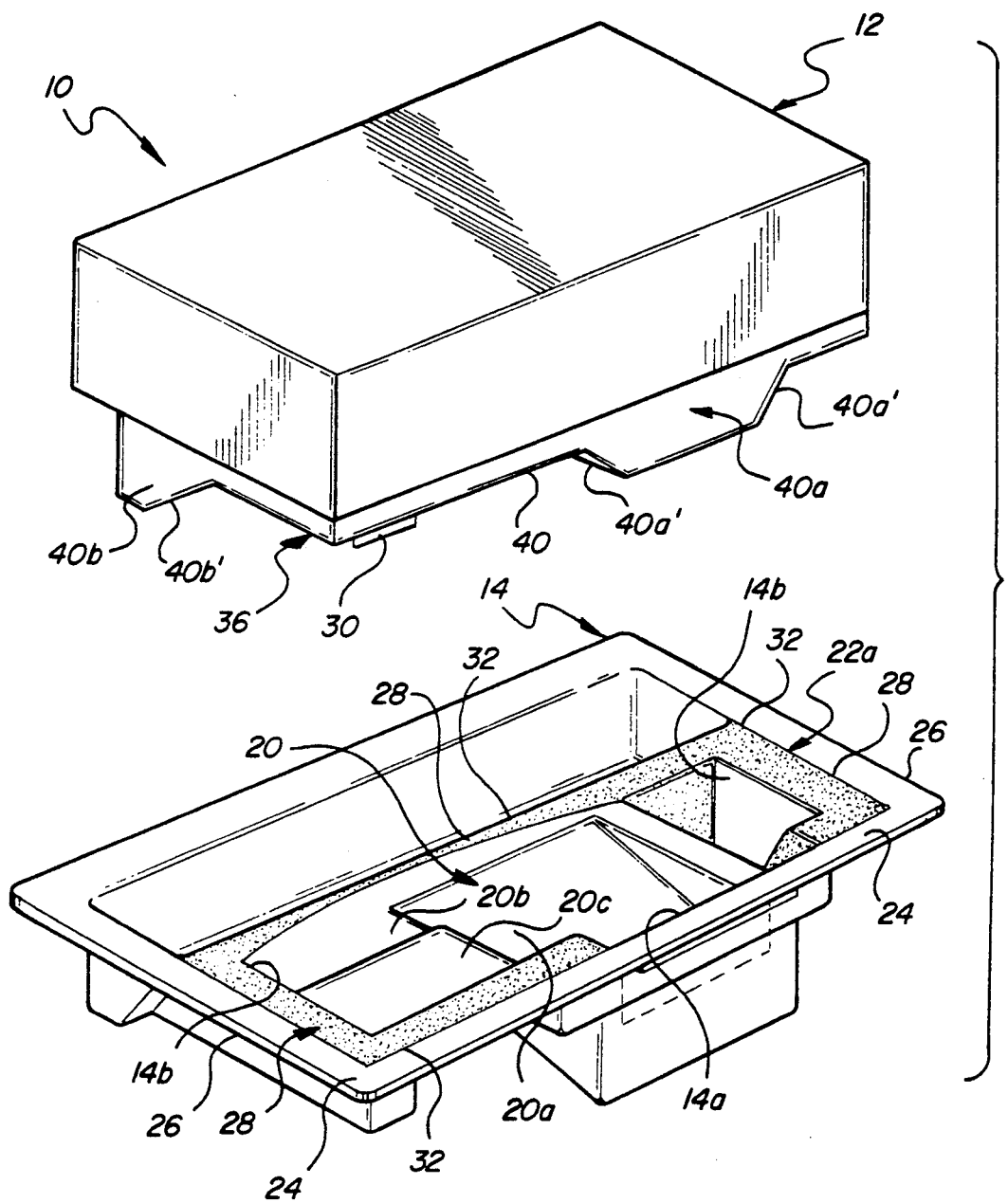
FIG. 1 is a perspective view of a mold apparatus constructed in accordance with the present invention including a selective charge application panel that seals a narrow width band portion and vertical waste surfaces on the perimeter of a mold.
Figure 1A:
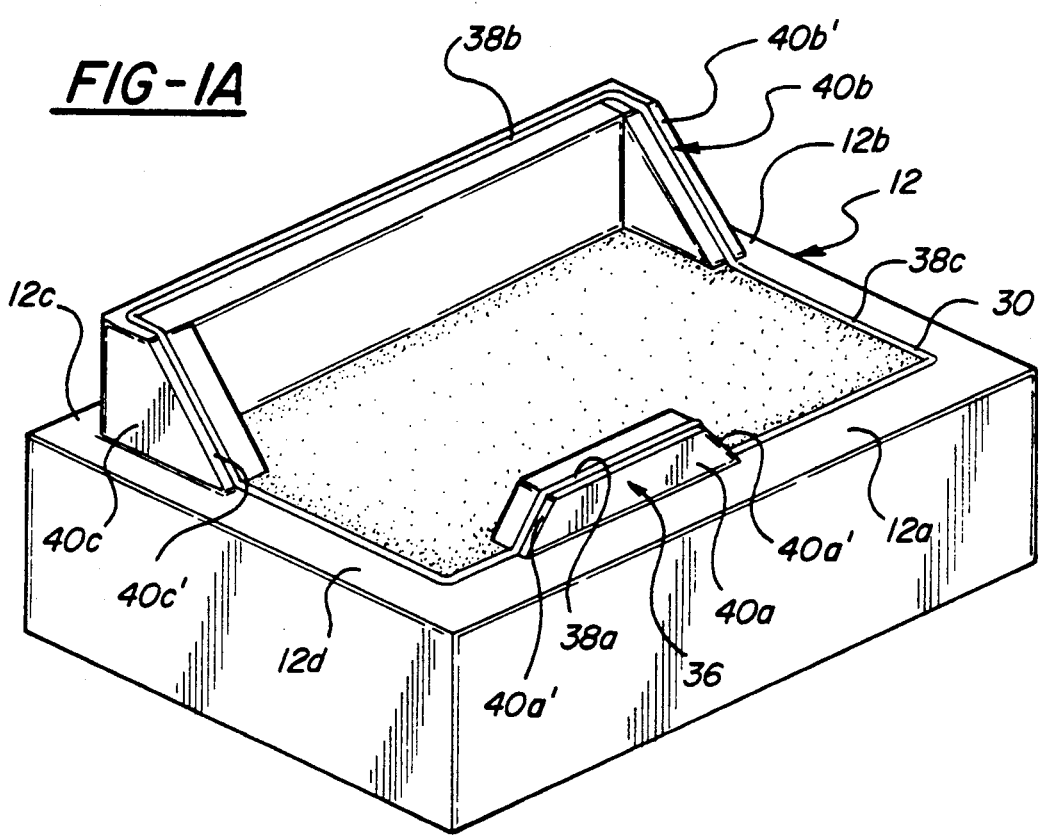
FIG. 1A is a perspective view of the powder box of FIG. 1 shown in an inverted position and filled with thermoplastic powder.

An apparatus for molding a thin-wall plastic shell constructed in accordance with the present invention is generally shown at 10 in the Figures. The apparatus 10 includes a powder box generally shown at 12 containing a powder resin 13 therein and a mold box generally shown at 14. The powder box 12 and mold box 14 are clamped together by suitable means well known in the art.

An alignment mechanism 16 of the type well known in the art would be used to align an opening 18 in the powder box 12 with a mold surface 20 of the mold box 14. The alignment is accomplished as the powder box 12 is elevated to cause the opening 18 and mold surface 20 to be displaced toward each other to an operative position as shown in FIG. 3 wherein the opening 18 and mold surface 20 are positioned in proximity to each other. Such means for positioning the powder box 12 can be in the form of an elevator commonly used in the art. Alternatively, the mold box 14 can be a moveable member positioned relative to a fixed powder box 12.

The mold surface 20 can be an electroform of nickel composition having suitable thermal conductivity as is well known in the art. The mold surface 20 defines the shape of the part to be molded. As shown in the Figures, the mold surface includes a deeply recessed mold surface 20a with joined offset surfaces 20b–20d surrounded by a variable height periphery 20e. The surfaces 20a–20e are uniformly heated to cause thermoplastic powder to melt and cure to form a molded part 21 having a variable height peripheral flange 22 of lesser dimensions than the peripheral surface 24 of mold box 14. In other words, the predetermined periphery 22a of the part 21 to be molded is spaced inwardly from the actual periphery 26 of the mold surface 24 to form a narrow width band region 28. During a molding operation, when the mold box 14 and powder box 12 are brought into close proximity, a peripheral gasket 30 on the powder box 12 engages the peripheral surface 24 along a gasket contact path 32 thereon to form a narrow width band portion corresponding to flange 22 around the molded part 21.

The mold assembly 10 is of the type for molding a thin-wall plastic shell from a thermoplastic powder. To achieve this end, the powder box 12 includes an inner chamber 34 and contoured selective charge application panel 36 for containing the powder thermoplastic resin 13 therein.

Figure 2:
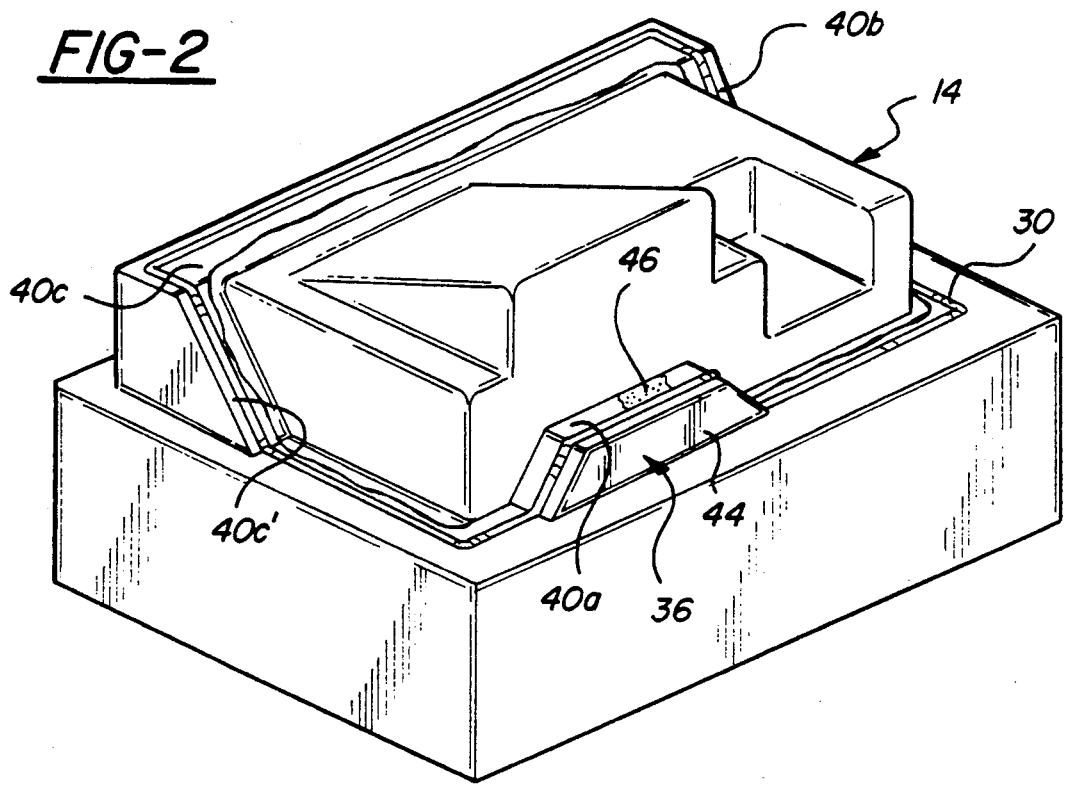
FIG. 2 is a perspective view of the powder box in FIG. 1 showing it assembled to a heated mold that is partially broken away.

One aspect of the present invention is that the contoured selective charge application panel portions 36 include gasket sealing means generally indicated at 30 that are held in a gasket retainer 38 connected on a panel 40 of the contoured selective charge application panel 36 that extends around the perimeter of the powder box 12. The panel 36 includes different width masking portions 40a, 40b, 40c that extend inwardly of the interior of the mold box 14, shown partially broken away in FIG. 2, when assembled to the powder box 12.

The gasket 30 is formed along variable height portions 38a, 38b, 38c of the retainer to seal along a gasket contact path 32 on the mold box, shown in FIG. 1, to form the sealed narrow width band region 28 as well as the vertically extending reduced area waste surface regions 14a, 14b on the mold box 14 that form triangular segments 21a, 21b on the molded part 21 as shown in FIG. 5. The gasket 30 extends across flange segments 12a, 12b, 12c of the powder box 12 so that the connection between the powder box 12 and the mold box 14 perfects a seal therebetween to prevent any loss of powdered resin from the assembled components while limiting the extend of powder flow onto portions of the mold box that are considered waste regions, e.g., surfaces on a heated mold on which thermoplastic powder will be fused and cured during a mold process and that require trimming from a finished mold part extracted from the mold box following the mold process.

More particularly, in accordance with the present invention the gasket 30 is held in place on the panel 40 and is positioned against the mold surface 20 after the powder box 12 is elevated and connected to the mold box 12 in a known manner. As shown in FIGS. 1 and 3, the positioning of the gasket 30 provides a variable depth narrow width band portion 28 around the shape of the molded part 21 that reduces the area of the waste surfaces 21a, 21b that are formed on the part 21 during a molding process in which all parts of the mold box 14 can be heated to the same temperature so as to avoid thermal differentials therein that might otherwise cause differential strain with resultant crack formation in the metal forming the mold box 14. The resultant molded part 21 has a variable height periphery 22 shown in perspective in FIG. 5. The periphery 22 is used to assist in the removal of the molded part 21 from the mold box 14 following a mold sequence wherein the mold box 14 is heated by oil or air in a manner as set forth in U.S. Pat. Nos. 4,217,325; 4,331,626; and 4,621,995 owned by the assignee of the present invention.

Furthermore, another aspect of the present invention is that the panel 40 of the powder box 12 extends into the mold box 14 to prevent the thermoplastic powder from contacting the entire surface of the heated mold. In many heated molds a substantial portion of the planar surface of the mold box 14 is not actually used to form a finished part surface and as a result there is the possibility of substantial waste material that requires trimming to form the complete plastic molded shell part.

By virtue of the panel portion 40 of the present invention, the mold box 14 is masked at waste surfaces on vertical portions 14a, 14b of the mold box 14 at a point horizontally inboard of the perimeter of the finished shape of the molded part 21 so as to cause the mold box 14 to be only selectively charged with the dry thermoplastic powder during the dumping of material or other distribution of the powder as for example when the mold box 14 and powder box are supported on a multi-axis rotation system for centrifugally distributing the powder material onto the heated exposed surfaces of the mold box 14. Thus, when the dry thermoplastic powder is dumped from the powder box 12 into the mold box 14 when the joined boxes are inverted as shown in FIG. 3, it can only contact the surface 20 and the variable height narrow band portion 28 around the molded part 21. The masking portions 40a, 40b, 40c cover the vertically extending waste surfaces 14a, 14b, 14c to prevent build up of thermoplastic powder thereon. Each of the masking portions have inclined ends 40a', 40b', 40c' to facilitate the draw between the powder box 12 and the mold box 14.

Consequently, no scrap material is formed on the portions of the heated mold part 14 that do not require shell material and there is a commensurate reduction of waste and the elimination of a trim step.

The advantage of the aforedescribed apparatus and method is that it eliminates the need for separate heating zones on a mold box to prevent build-up of waste material on such molds. Furthermore, it eliminates the formation of partially deposited residual material on thermally insulated cold surfaces of the separate heating zones that must be vacuumed away after every part cycle to prevent casting defects. Furthermore, such residual partially cured material collected in the vacuum cleaning step cannot be recycled and must be scrapped.

As stated in the summary of the invention, the panel 40 can be fabricated to have an outer cover 44 of fiberglass and a core 46 of polyurethane foam. The retainer 38 can be a metal or plastic clamp or groove part and the gasket 30 can be an elastomeric material suitable to applications of the invention, rubber being one suitable material.

Another feature of the present invention is that the selective charge method and apparatus described herein requires less maintenance compared to systems in which insulators or selective heating circuits are used on the heated mold. When such insulators or separate heating or cooling circuits are connected to the mold box they must be removed each time that a mold is repaired or surface cleaned. After the repair or cleaning step is performed the insulators or selective heating circuits must be reattached in a time consuming procedure that unduly complicates production scheduling while increasing downtime for a particular mold apparatus system.

In the present invention the use of a powder box with a selective charge application panel configured to form a narrow width band portion around the periphery of the finished mold part 21 eliminates the requirement of ancillary part connections on the heated mold 14. The elimination of add-ons on the molded part prevents contamination problems as for example when powder particles of one color or type are trapped within a poorly sealed insulator of the type shown in U.S. Pat. Nos. 4,683,098 and 4,716,003 so as to fall into a different mold at a later time to create undesirable imperfections in a later formed molded part. Such defective shells have to be scrapped.

The selective charge method and apparatus of the present invention also extend tool life of heated mold boxes since the mold boxes used with a powder box having the selective charge application panel and panels of the present invention do not require a temperature differential across different surface regions thereon and as a consequence there is a lesser tendency to cause strain levels in a mold box configuration that can lead to cracks and ultimate failure of the mold part.

The masking effect of the selective charge application panel of the present invention to produce selective charge of a heated mold surface conforming to the shape of a finished part plus a narrow width band portion therearound, the whole upper tool surface (whether all or only a portion of the tool surface is used to form a shell part thereon) can be heated to the same temperature to reduce strain differentials in the mold heretofore experienced in other mold box heat and insulation systems utilized to minimize powder waste.

The method of the present invention includes the steps of providing a heated mold box having a shell mold with a preselected interior area thereof devoted to formation of a shell part having a shape corresponding to the interior area and including at least a second interior area with a vertical height on which waste material can be deposited and uniformly heating both the first and second interior areas to the same molding temperature. The method further includes the step of providing a powder box for containing thermoplastic powder having a selective charge application panel thereon configured to form a gasket contact path on the mold box that forms a narrow width band portion around the interior surface area and that is positioned at variable depths around the interior surface area to reduce the amount of vertical side surface exposure on the heated mold on which waste material can be deposited. Thereafter joining the shell mold and the powder box and distributing thermoplastic material on the heated shell mold to form a narrow width band area that extends from the perimeter of the mold part and that varies in height to mask the vertical height of the second interior area on which waste material can be deposited so as to reduce waste of thermoplastic powder by limiting deposition thereof to the narrow width band portion and the first interior area.

Unlike prior art assemblies, very little if any trimming of the part 21 is required because the powder from the powder box is only disposed over the portion of the mold surface 20 defined by the periphery 22 which corresponds exactly to the extent of the part to be formed. The present invention can be adapted so as to be usable with several molds having varying depths as the powder box 12 can be configured to different extents depending upon the vertical and horizontal position of vertical waste surface 14a, 14b on the mold box 14 that must be masked by the gasket 30. Thus, the present invention provides a sealed chamber in deep molds that cannot be reached by conventional powder box configurations.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not be in any way limiting, the invention may be practiced otherwise than as specifically described.

What is claimed is:

1. In a mold assembly (10) for deposition of thermoplastic powder on a heated shell mold box (14) being provided with a deeply recessed mold surface (20) for forming a thin-walled plastic shell (21) and having vertical waste surfaces wherein said thermoplastic powder is carried by a powder box (12) having a gasket (30) connected thereto engageable with a horizontal runoff surface (24) surrounding said mold surface (20) in said mold box for preventing leakage of said thermoplastic powder from said mold box when said powder box is connected thereto, the improvement comprising:

a contoured selective charge application panel (40) connected to said powder box along a perimeter of said powder box and extending from said powder box and toward said heated shell mold box when said powder box and said heated shell mold box are positioned for deposition;

a gasket retainer (38) connected to said selective charge application panel and said gasket (30) connected to said gasket retainer for contacting said mold box, said gasket having a variable height and being spaced horizontally outwardly from said mold surface so as to form a variable height narrow width band portion (28) along said horizontal runoff surface that allows said thermoplastic powder to be deposited thereon to provide a peripheral flange (22) on said thin-walled plastic shell for assisting in removal of said plastic shell from said mold box; and side extensions (40a, 40b, 40c) on said panel having vertical side surfaces offset relative to said gasket and insertable into said mold box and cooperating with said gasket for masking said vertical waste surfaces of said mold box thereby limiting deposition of said thermoplastic powder as waste on said vertical waste surfaces of said heated mold box.

2. In an apparatus (10) for molding a thin-walled plastic shell (21), said apparatus (10) comprising: a powder box (12) including an opening (18) for receiving and removing powder therefrom; a mold box (14) including a mold surface (20) located therein and having a predetermined outer periphery (26) surrounding said mold surface, said mold surface including vertical waste surfaces (14a, 14b); positioning means for positioning either of said mold box (12) and powder box (14) in an operative position wherein said opening (18) and said mold surface (20) are positioned in proximity to each other, the improvement comprising: a contoured selective charge application panel (36) disposed about said opening (18) of said powder box and having variable height portions (40a–40c), said portions having a gasket connected thereto spaced horizontally inwardly from said outer periphery of said mold box to form a narrow width band that allows formation of a peripheral flange (22) on said plastic shell for assisting in removal of said plastic shell from said mold box, and said portions having a plurality of vertical masking surfaces offset from said gasket and located in positions for insertion into said mold box to mask said vertical waste surfaces (14a, 14b) on said mold box (12) so as to perfect a sealed passageway between said opening (18) of said powder box and said outer periphery (26) of said mold box (14) during molding of said thin-walled plastic shell.

3. In a mold assembly (10) for deposition of thermoplastic powder into a heated shell mold box (14) to form a thin-walled plastic shell wherein said thermoplastic powder is carried by a powder box (12) having a gasket (30) connected thereto engageable with a runoff surface (24) on said shell mold box for preventing leakage of said thermoplastic powder from said shell mold box when said powder box is connected thereto, said shell mold box including vertical waste surfaces (14a, 14b), the improvement comprising:

said shell mold box having a deeply recessed mold surface (20a) therein with a plurality of joined offset surfaces (20b, 20c) forming a surface configuration (20) corresponding to a finished outer surface of said plastic shell molded by deposition of heated material against said surface configuration adjacent said vertical waste surfaces (14a, 14b);

a contoured selective charge application panel (40) connected to said powder box along a perimeter thereof for insertion into said mold box and having a peripheral shape corresponding to a peripheral shape of said surface configuration and extending a predetermined horizontal distance (32) inwardly from said peripheral shape (26) of said surface configuration to form a narrow width band portion (28) around said surface configuration on said runoff surface, and having side portions (40a, 40b, 40c) on said panel having vertical surfaces offset relative to said gasket and extending vertically for insertion with said panel into said mold box for shielding said vertical waste surfaces of said mold box from deposition of said thermoplastic powder;

a gasket retainer (38) connected to said panel and said gasket (30) connected to said gasket retainer for contacting said runoff surface of said shell mold box horizontally outwardly of said narrow width band portion and at variable vertical heights for allowing formation of a peripheral flange (22) on said plastic shell and for sealing said side portions so when said side portions are inserted into said mold box said thermoplastic powder is primarily deposited on said heated shell mold box inwardly of said narrow width band portion and on said deeply recessed mold surface and on said joined offset surfaces (20b, 20c) while said vertical waste surfaces are shielded from said deposition.

4. A process for manufacturing a thin-walled plastic shell (21) using a mold assembly (10) including a mold box (14) provided with a deeply recessed mold surface (20) surrounded by a plurality of vertical waste surfaces and a horizontal runoff surface and including a powder box (12) containing powder resin and having an opening (18) surrounded by a contoured selective charge application panel (36) provided with a variable height gasket (30) and vertical side portions (40a, 40b, 40c) offset from said gasket (30), said method including the steps of: heating said mold box (14) so as to provide said mold surface (20) with a uniform temperature; combining said mold box and said powder box by positioning said mold surface (20) relative to said opening (18) so that said opening (18) and said mold surface are in proximity to each other and said vertical side portions of said panel are located within said mold box (14) and cooperate with said gasket (30) to mask said plurality of vertical waste surfaces of said mold box (14) while simultaneously causing said gasket (30) to engage said horizontal runoff surface of said mold box (14) at variable heights to form a variable height narrow width band portion (28) along said horizontal runoff surface of said mold box (14) that allows said powder resin to be deposited adjacent said mold surface (20) to form a peripheral flange (22) on said plastic shell (21) for assisting in removal of said plastic shell from said mold box (14); and positioning said combined powder box (12) and mold box (14) so that said powder resin is deposited onto said variable height narrow width band portion and on said mold surface (20) of said mold box to form said thin-walled plastic shell (21) with said peripheral flange thereon while preventing deposition of said powder resin as waste on said masked vertical waste surfaces of said mold box.

* * * * *